Patented June 14, 1932

1,862,740

UNITED STATES PATENT OFFICE

THOMAS A. EDISON, OF WEST ORANGE, NEW JERSEY, ASSIGNOR TO THOMAS A. EDISON, INCORPORATED, OF WEST ORANGE, NEW JERSEY, A CORPORATION OF NEW JERSEY

PRODUCTION OF MOLDED ARTICLES

No Drawing. Application filed October 6, 1928. Serial No. 310,920.

My invention relates to the production of molded articles and more particularly to an improved method for molding such articles as are made of rubber containing material or the like and to molds or platens used in carrying out such method and coated so as to prevent the material of the articles molded from adhering to the molds when such articles are removed therefrom.

In molding articles formed of materials such as hard and soft rubber, especially where a high heat and pressure are employed in the molding operation, much difficulty is experienced in removing the molded articles from the metallic molds usually employed, without more or less of the materials of the articles adhering to the molds. This damages the articles and results in the rejection of an appreciable percentage thereof as faulty and also renders it necessary to clean the molds after each molding operation.

I have discovered that these objections may be obviated by applying a coating of a thin solution of an asphalt, preferably gilsonite which I find gives the best results, to the molding surfaces of the molds or platens, previous to the molding operation, in any suitable manner as by brushing or painting the same thereon. After so applying the thin solution of gilsonite or other asphalt, the molding surfaces of the molds are dried either by allowing the solvent in the solution to evaporate or by the heat of the molds in the molding operation, with the result that such molding surfaces will be completely covered by an exceedingly thin film of the gilsonite or other asphalt. The material to be molded is placed in the coated molds and subjected to the molding operation, usually under a high heat and pressure, after which the molded articles are easily removable from the molds without any of the material of such articles adhering or sticking to the molding surfaces. Moreover, the surfaces of hard rubber articles thus produced are so smooth and having such a high gloss it is unnecessary to buff or polish them, this being due to the fact that but a very slight amount of the mold coating of gilsonite or the like in the form of a film of infinitesimal thickness, adheres to such articles upon removal thereof from the molds.

In molding some materials, it is necessary to apply the solution of gilsonite or other asphalt to the molding surfaces of the molds but infrequently. For example, in the production of hard rubber articles, I have found it necessary to apply a solution of gilsonite to the molding surfaces of the molds only once for every ten or twelve molding operations, while in the production of molded articles formed of soft rubber it is necessary to apply such a solution to the molds even less frequently. The gilsonite in no way affects the materials which are molded in molds coated therewith, and in the case of articles formed of hard rubber, the amount of the gilsonite which adheres to such articles on removing the latter from the coated molds is so very slight and the color thereof is so nearly that of the rubber that the gilsonite is indiscernible.

It is highly advantageous to use a solution such as described for coating molds used to produce hard rubber insulators for use in battery cells having alkaline electrolytes, for I find that such use of insulators so produced results in no injurious effects to the cells, whereas the contrary is true in the case of insulators produced by the use of molds coated, as is common practice in the rubber industry, with a soap or soap solution.

Various solvents, including benzol, gasoline and solvent naptha, may be used for dissolving the gilsonite or other arsphalt. I find, however, that solvent naptha is the most satisfactory and this is the solvent I preferably employ. In producing a solution of gilsonite, the latter is dissolved in the solvent naptha, preferably by introducing the gilsonite a little at a time into a suitable quantity of solvent naptha disposed in a drum or tank; the solvent naptha preferably being continuously agitated in order to hasten the action and preferably being maintained at room temperature. The gilsonite is dissolved in the solvent naptha in various proportions according to the material to be molded and the shapes of the molds and of the articles to be produced. For the production of rubber sheets and articles of simple configuration, best results are obtained by the use of the very thin solution produced by dissolving about 570 grams of gilsonite in 50 gallons of solvent naphtha; while for rubber articles of such shape or design as to render the same difficult to remove from the molds, it is preferable to use a somewhat thicker solution produced by dissolving about 556 grams of gilsonite in 12 gallons of solvent naphtha.

While I have described the preferred manner in which my invention is carried out, it is to be understood that the same is subject to various changes and modifications without departing from the spirit of the invention or the scope of the appended claims.

Having now described my invention, what I claim as new and desire to protect by Letters Patent is as follows:

1. The process which consists in applying a thin film of gilsonite to a mold by coating the latter with a solution of such gilsonite in a solvent which is readily volatilized, then placing rubber containing material to be molded in the mold in direct contact with said film and molding the same, and removing the molded article from the mold, substantially as described.

2. The process which consists in applying a solution of gilsonite in solvent naptha to the molding surface of a mold, then removing the solvent from such solution, leaving a thin film of gilsonite on such surface, then placing rubber containing material to be molded in the mold and molding the same, and removing the molded article from the mold, substantially as described.

3. The process which consists in applying a thin film of gilsonite to a mold, then placing rubber containing material to be molded in the mold in direct contact with said film and molding the same under a high heat and pressure, and removing the molded article from the mold, substantially as described.

This specification signed this 4th day of October, 1928.

THOS. A. EDISON.